March 21, 1967 H. EICHHOLZ 3,310,033
ANIMAL FOOD PORTIONING APPARATUS
Filed Sept. 9, 1965 4 Sheets-Sheet 2
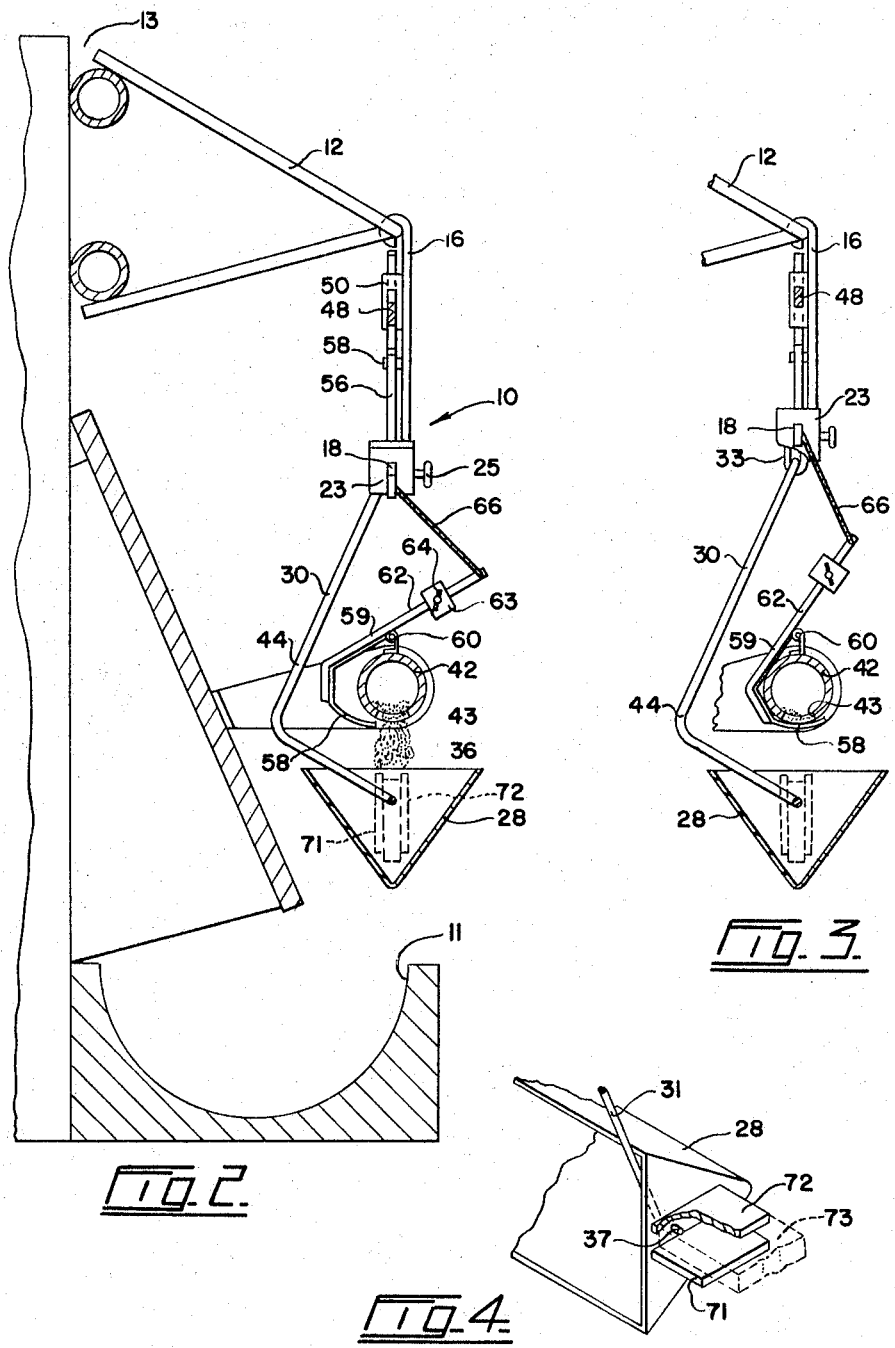
INVENTOR
HEINZ EICHHOLZ
BY
Fetherstonhaugh & Co.
ATTORNEYS

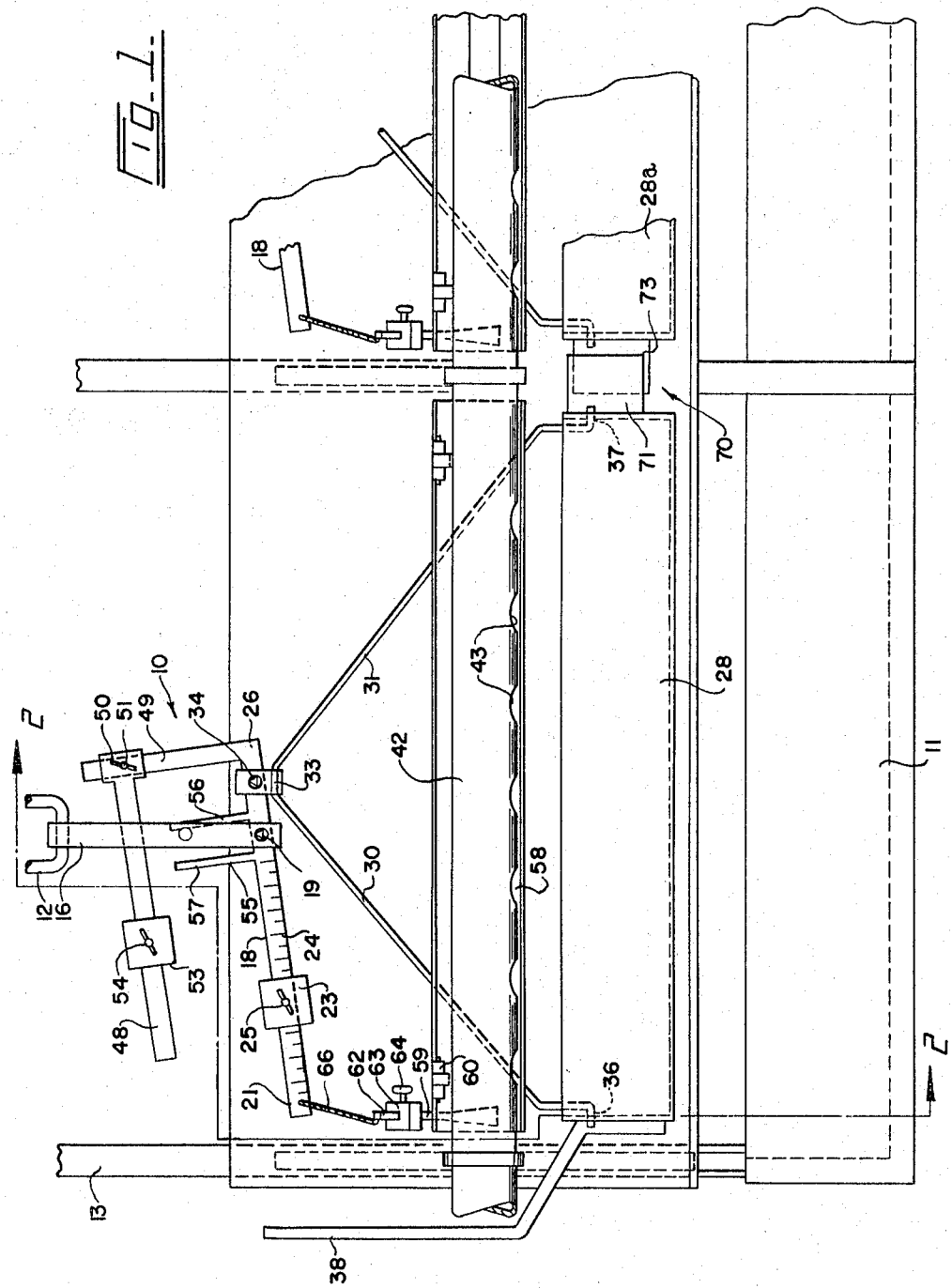

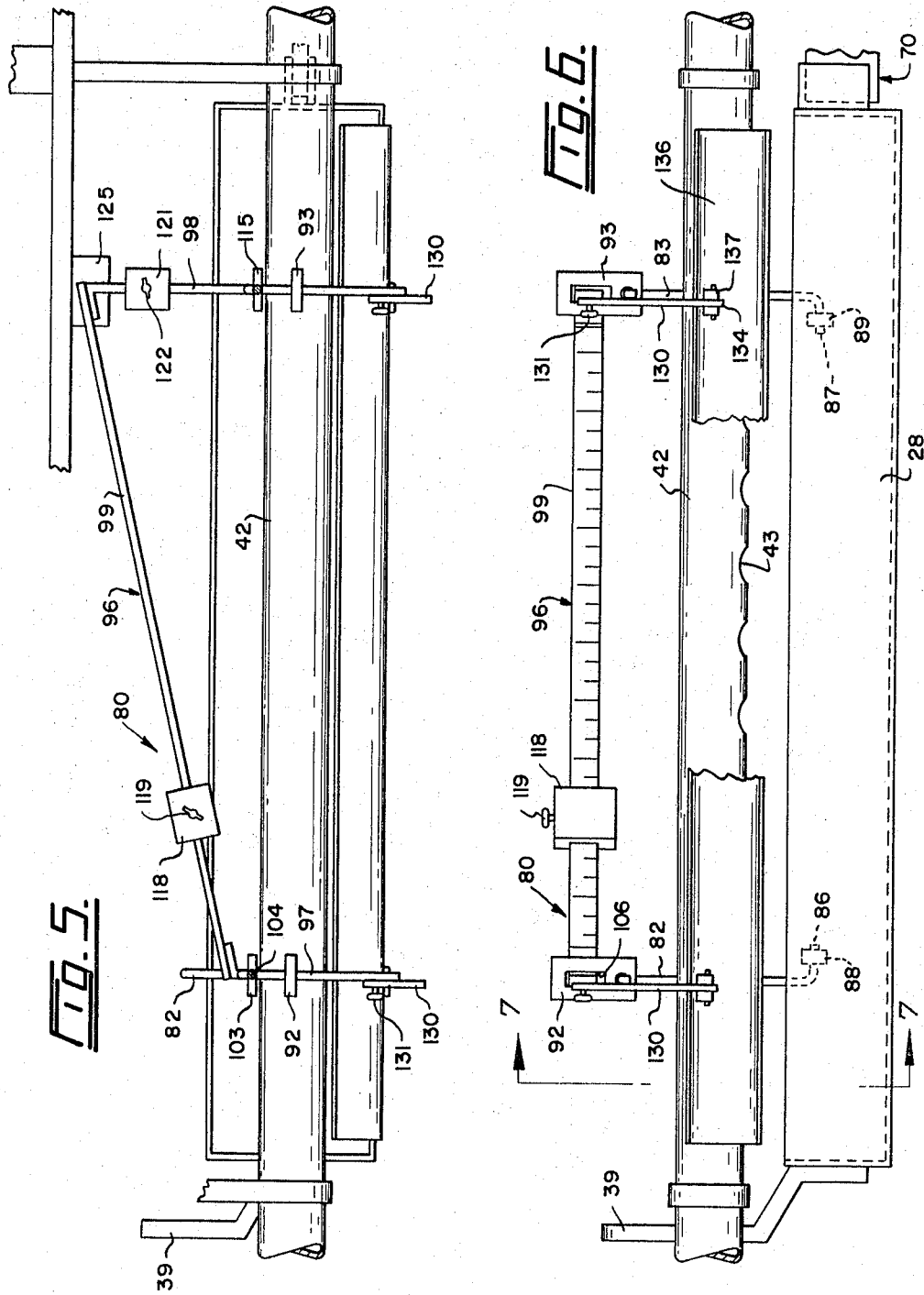

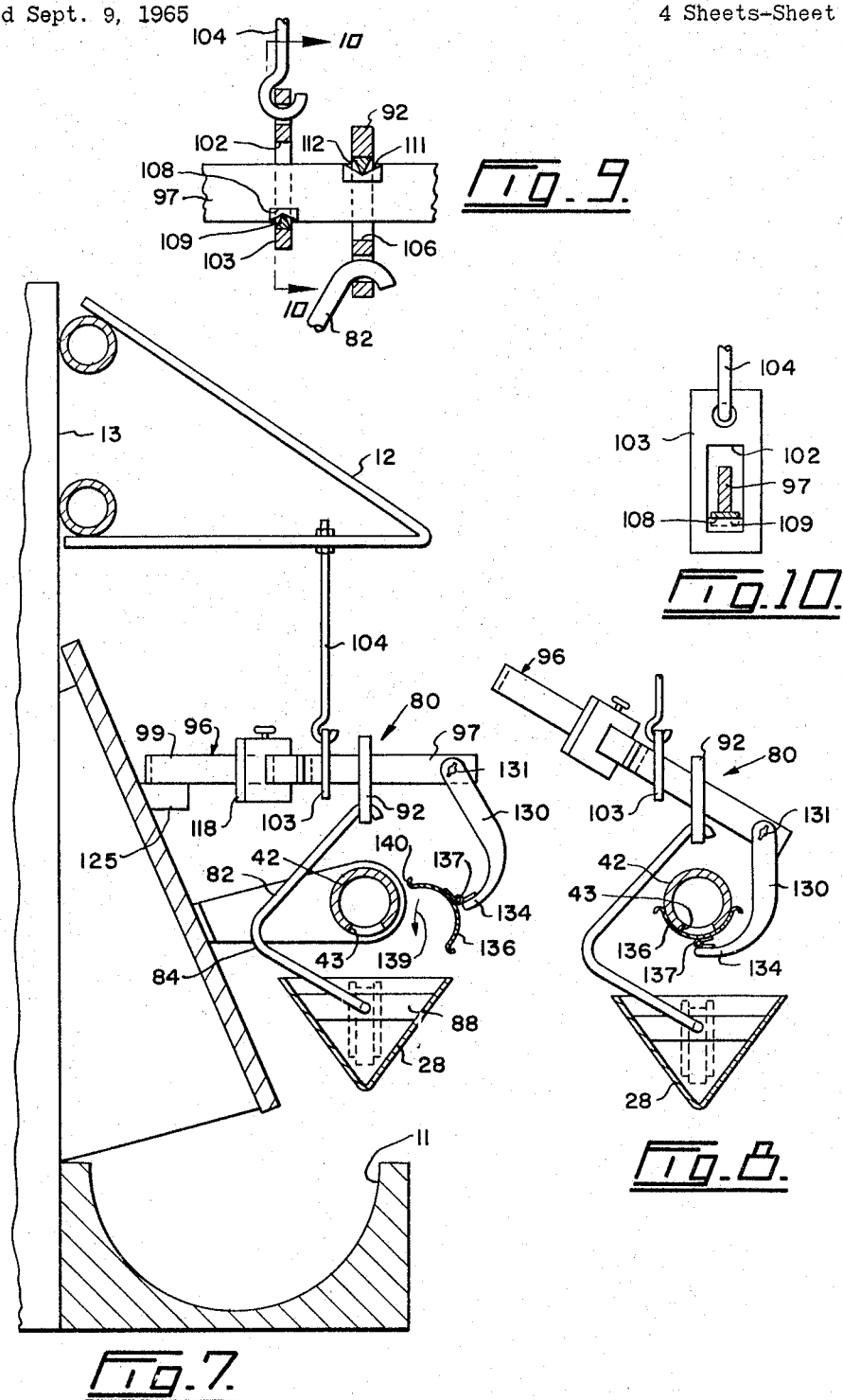

United States Patent Office 3,310,033
Patented Mar. 21, 1967

3,310,033
ANIMAL FOOD PORTIONING APPARATUS
Heinz Eichholz, Schapen 4441, Kreis Lingen, Germany
Filed Sept. 9, 1965, Ser. No. 495,007
Claims priority, application Germany, Apr. 16, 1962,
E 22,743
20 Claims. (Cl. 119—56)

This application is a continuation-in-part of my application filed April 4, 1963, Serial Number 270,632, now abandoned.

This invention relates to apparatus for automatically portioning food in predetermined amounts for animals.

There are in existence devices for conveying or directing food to feeding troughs and the like for animals, but none is able to portion the food out in exact predetermined amounts. A known device for conveying food to troughs for animals consists of a conveyor tube extending along the feeding troughs spaced therebove, and having openings in its underside through which the food drops down into the troughs. The food, mainly dry food in the form of grain or chopped vegetation, is moved along the tube by pushers, chains, or spiral screws. However, with this apparatus, there is no way of accurately portioning the food for the animals.

An object of this present invention is the provision of apparatus which automatically portions animal food in predetermined weights or amounts for feeding troughs.

Another object is the provision of apparatus of very simple construction for portioning animal food in predetermined amounts.

The present apparatus for portioning animal food in predetermined amounts is adapted to be used with a food conveyor located above a trough and which has outlet means therein for discharging food towards the trough. This apparatus comprises a support carrying pivot means, a balance arm mounted on the pivot means of said support means, adjustable balance means on one side of the pivot means and connected to the arm for normally retaining said arm in a first unbalance position, the centre of gravity of said balance means being located above said pivot means and remaining at a constant distance therefrom during balancing movement of the arm, a receptacle carried by the arm on the other side of the pivot means, and positioned to receive food from a supply source, said receptacle moving the arm to a second unbalance position opposite the first unbalance position when said receptacle receives a predetermined weight of food, and shut-off means for the supply source operatively connected to said one side of the balance arm adapted to stop the flow of food into the receptacle when the arm swings to the second unbalance position, the location of the centre of graviy of said balancing means causing the movement of the arm to accelerate as said arm moves towards the second unbalance position.

Two examples of this invention are illustrated in the accompanying drawings, in which, FIGURE 1 is a side elevation of one form of food portioning apparatus, FIGURE 2 is a cross section taken on the line 2—2 of FIGURE 1, FIGURE 3 is a fragmentary section of the apparatus similar to FIGURE 2, showing the apparatus after it has received a predetermined amount of food, FIGURE 4 is a perspective view of one end of the receptacle of the apparatus, showing the receptacle in position to empty the food into a feeding trough, FIGURE 5 is an alternative form of food portioning apparatus, FIGURE 6 is a front elevation of the apparatus in position to receive food, FIGURE 7 is a cross section taken on the line 7—7 of FIGURE 6, with the addition of supporting means for the apparatus and a feeding trough therebeneath, FIGURE 8 is a fragmentary section similar to FIGURE 7 showing the apparatus with the predetermined amount of food therein, FIGURE 9 is an enlarged fragmentary sectional view showing part of the balancing means of the balancing arm, and FIGURE 10 is a section taken on the line 10—10 of FIGURE 9.

Referring to FIGURES 1 to 4, 10 is one form of food portioning apparatus which is shown mounted above a foot trough 11. This apparatus is carried by a bracket 12 projecting from the back wall 13 of a stall in which trough 11 is located.

Apparatus 10 includes a support 16 which is secured to bracket 12 in any desired manner and hangs downwardly therefrom. A balance arm 18 is swingably mounted between ends thereof on support 16. This arm is balanced on support 16 in the same manner as the weighing arm of a scales, a pivot 19 being shown in FIGURE 1 for this purpose. Adjustable balance means is provided for arm 18 for normally retaining said arm in an off balance position. Part of this may be an adjustable spring for drawing the end 21 of the arm downwardly, but it is preferable to use a weight 23 slidably mounted on said arm between pivot 19 and end 21 for this purpose. A scale 24 is provided on the arm in order to indicate positions to which weight 23 needs to be moved in order that different amounts of food may be portioned by the apparatus. Weight 23 may be secured in any position on arm 18 by means of a set screw 25. Suitable suspension means is connected to arm 18 between its opposite end 26 and pivot 19 for carrying an open receptacle 28. In the illustrated example, the suspension means includes diverging supporting bars 30 and 31 which are connected together at their upper ends and carried by a strap 33 which is connected to arm 18 by a piovt 34, preferably of the type used in weighing scales. The illustrated receptacle 28 is relatively long and U-shaped in cross section, see FIGURE 2. Arms 30 and 31 have outwardly extending pins 36 and 37 secured to their lower ends, said pins rotatably fitting in the end walls of receptacle 28. Receptacle 28 normally sits upright with its open top facing upwardly, and an operating lever 38 is connected to one end thereof by means of which the receptacle may be tipped on the pins 36 and 37 to empty its contents into trough 11 therebelow.

A food supply source is mounted just above and is adapted to direct food into receptacle 28. In this example, the supply source is in the form of a horizontal conveyor tube 42 having openings 43 in its lower surface facing receptacle 28. Suitable means, not shown, is provided in the tube for moving food therealong. As is well known in the art, this moving means may be in the form of pushers, chains or spiral screws. By referring to FIGURE 2, it will be seen that bars 30 and 31 are offset laterally, as indicated at 44, to extend from strap 33 around tube 42 and back beneath said tube in order to hold receptacle 28 directly under the latter.

An auxiliary balance arm 48 is provided for arm 18. An extension 49 connected to end 26 of arm 18 extends upwardly therefrom at right angles thereto. A sleeve 50 is slidably mounted on extension 49 and is held in any desired position thereon by means of a set screw 51. Auxiliary arm 48 is fixedly connected to sleeve 50 and extends outwardly therefrom parallel to but spaced from arm 18, as clearly shown in FIGURE 1. A weight 53 is slidably mounted on arm 48 and may be held in any desired position thereon by a set screw 54.

Spaced fingers 56 and 57 extend upwardly from arm 18 on opposite sides of pivot 19 and are adapted to engage a stop 57a on support 16 to limit the upward and downward swinging movement of arm 18 about its pivot 19.

Closure or shut-off means is operatively connected to balance arm 18 and positioned to close and open the outlets or openings 43 of tube 42. For this purpose, a dished plate 58 is carried by arms 59 which are connected by hinges 60 to the upper surface of tube 42. Arms 59 are curved around said tube so that plate 58 may be moved underneath the tube, as shown in FIGURE 3, to close openings 43, and away from said openings, as shown in FIGURE 2. One of the arms 59 has an extension 62 inclined upwardly therefrom upon which a counterbalance weight 63 is slidably mounted, said weight being held in any desired position on the extension by a set screw 64. The upper or free end of extension 62 is connected by a connector, such as a cable 66, to balance arm 18 near end 21 thereof. When arm 18 is in its unbalanced position, as in FIGURES 1 and 2, weight 63 has swung plate 58 from beneath tube 42 to uncover openings 43 thereof. When said balance arm is swung upwardly, cable 66 draws the outer end of extension 62 upwardly to swing plate 58 into its closing position beneath tube 42.

Weights 23 and 53 form balance means positioned on one side of pivot 19 while bars 30 and 31 and receptacle 28 are located on the other side of said pivot. When the receptacle is empty, weights 23 and 53 swing arm 18 to an unbalance position, limited by finger 56 engaging stop 57a. As weight 53 is spaced well above arm 18, said balance means has a centre of gravity above pivot 19, and as weights 23 and 53 are fixed on their respective arms during operation of the apparatus, said centre of gravity remains a constant distance from said pivot.

Feed is moved along tube 42 and drops downwardly therefrom through openings 43 into receptacle 28 along the length of the latter. When a predetermined weight of food has been deposited in the receptacle, the weight overbalances weights 23 and 43 causing end 21 of arm 18 to swing upwardly. Although the centre of gravity of said balance means remains a constant distance from pivot 19, said centre of gravity moves substantially in a horizontal direction towards a vertical plane passing through pivot 19, thereby shortening the effort arm on one side of said pivot relative to the load arm on the other side thereof. This causes the swinging movement of arm 18 to accelerate until the arm reaches a second unbalance position which is attained when finger 57 engages stop 57a.

This swinging movement of arm 18 swings arms 59 downwardly to shift plate 58 beneath tube 42 to close off outlets 43 and thereby stopping the flow of feed into container 28. The acceleration of the swinging movement of arm 18 once it starts to move, results in the flow of feed being quickly stopped so that it is possible very accurately each time to control the amount of feed directed into the receptacle. Lever 38 is swung downwardly to empty the contents of receptacle 28 into trough 11. When the receptacle is empty, weights 23 and 53 cause arm 18 to swing back to its first unbalance position, thereby swinging plate 58 away from tube 42.

When the receptacle is released, arm 18 returns to its first unbalanced position, at which time plate 58 is moved to open the outlets 43 of tube 42 to permit food to be again directed into receptacle 28.

This invention contemplates the idea of being able simultaneously to empty a plurality of longitudinally aligned receptacles 28 into one or more troughs therebeneath. FIGURE 1 illustrates adjacent receptacles 28 and 28a. A coupling 70 is provided between adjacent ends of these receptacles, said coupling being constructed so that the receptacles may move up and down relative to each other as they are emptied and filled. Coupling 70 consists of spaced vertical plates 71 and 72 mounted on the end of receptacles 28 and extending towards receptacle 28a. A similar vertical plate 73 is mounted on and extends outwardly from the adjacent end of receptacle 28a freely between plates 71 and 72. Plates 71–72 are free to move vertically relative to plate 73, and yet when receptacle 28 is tipped by means of lever 38, coupling 70 causes receptacle 28a to tip at the same time. With this arrangement, the predetermined amount of animal food is directed into each of these receptacles, the correct amount being deposited in each one regardless of the rate of feed thereto, and then the receptacles are tipped simultaneously.

FIGURES 5 to 10 illustrate an alternative food portioning apparatus 80, which functions in the same general way as apparatus 10. In apparatus 80, instead of bars 30 and 31, receptacles 28 are carried by spaced vertical supporting bars 82 and 83 which are bent as indicated at 84 in FIGURE 7 to extend around tube 42. Bars 82 and 83 have pins 86 and 87 at the lower ends thereof which rotatably fit into lugs 88 and 89 which are fixed to receptacle 28. The upper ends of bars 82 and 83 are swingably connected to identical holders 92 and 93. A balance arm 96 is provided, said balance arm having a short extension 97 and a parallel long extension 98, the ends of said extensions being connected by a bar 99. Extension 97 of the balance arm extends through a relatively large hole 102 in a holder 103 which, in turn, is suspended by a hook 104 from bracket 12. Extension 97 also extends through a large hole 106 in holder 92. By referring to FIGURE 9, it will be seen that extension 97 has a notch 108 in its lower edge into which a pivot 109 carried by holder 103 fits. This extension also has a notch 111 in its upper edge into which a pivot 112 of holder 92 fits. In other words, hook 104 carries bar 82 through holder 103, extension 97 and holder 92.

Extension 98 of the balance arm is carried in the same manner as extension 97 and has associated therewith holder 93 which is identical with holder 92, and another holder 115 which is identical and aligned with holder 103. Holder 115 carries extension 98, holder 93 and bar 83. A weight 118 is slidably mounted on bar 99 of the balance arm and may be held in any adjusted position by a set screw 119. If desired, another weight 121 is slidably mounted on extension 98 between holder 115 and bar 99, said weight being held in any desired position on the extension by a set screw 122. Weights 119 and 122 form balancing means which tend to swing bar 99 of balance arm 96 downwardly to an unbalance position, and it is to be understood that instead of these weights, one or more adjustable springs may be provided for urging the balance arm 99 downwardly.

A stop 125 is provided on the adjacent wall structure beneath bar 98 to limit the downward movement thereof so as to keep extensions 97 and 98 normally in substantially horizontal positions.

A pair of identical arms 130 are secured by set screw 131 to the free ends of extensions 97 and 98 on the side of the pivots of holders 103 and 115 remote from weights 118 and 121. These arms 130 are normally inclined downwardly and outwardly from their respective extensions, see FIGURE 7. Each arm 130 has a lug 134 on its lower end projecting inwardly towards tube 42. A curved plate 136 is connected to the outer ends of lugs 134 by hinges 137, said plate extending longitudinally of tube 42 and opening towards the latter. The plate is so balanced that it tends to rotate around hinges 137 in the direction of arrow 138 in FIGURE 7. The upper edge 140 of plate 136 is positioned so that when the outer ends of extensions 97 and 98 swing downwardly around the pivots of holders 103 and 115, causing arms 130 to swing towards tube 42, said plate edge engages the tube and swings into a position beneath said tube to cover its opening 43, as clearly shown in FIGURE 8, thus closing the tube openings.

Apparatus 80 basically functions in the same manner as apparatus 10. When receptacle 28 is empty, weights 118 and 122 keep the balance arm in an unbalance position with extensions 97 and 98 in substantially horizontal positions, at which time closure plate 136 is held away from tube 42. Food moved through said tube drops downwardly through openings 43 thereof into receptacle 28. When a predetermined amount or weight of food is deposited in the receptacle, this being determined by the position of weights 118 and 122 on bar 99 and extension 98, respectively, the outer ends of extensions 97 and 98 tip downwardly, causing plate 136 to be moved into its closing position beneath tube 42 to prevent food from passing out therefrom through its openings 43. Receptacle 28 may be tipped then by means of lever 38 to empty its contents into trough 11. As soon as the weight of the food is removed from the receptacle, the balance arm returns to its normal position, causing plate 136 to uncover tube holes 43 to permit more food to be deposited in the receptacle.

By referring to FIGURES 6, 7 and 9, it will be seen that the centre of gravity of the balance means formed by weights 118 and 121 is above the pivots of supports 103 and 115. This centre of gravity remains a constant distance from said pivots during operation of the apparatus, but as arm 96 starts to tip as a result of the weight of feed in receptacle 28, the effort arm shortens on one side of the pivots in relation to the load arm on the opposite side thereof and therefore the tipping or swinging action accelerates quickly to cause plate 136 to stop the flow of feed into the receptacle. When the receptacle is empty, weights 118 and 121 return arm 96 to its first unbalance position.

What I claim as my invention is:

1. Apparatus for portioning animal food in predetermined amounts, comprising pivot means, a balance arm mounted on said pivot means, adjustable balance means on one side of the pivot means and connected to the arm for normally retaining said arm in a first unbalance position, the centre of gravity of said balance means being located above said pivot means and remaining at a constant distance therefrom during balancing movement of the arm, a receptacle carried by the arm on the other side of the pivot means and positioned to receive food from a supply source, said receptacle moving the arm to a second unbalance position opposite the first unbalance position the instant said receptacle receives a predetermined weight of food, said balance means retaining the arm in the first unbalance position until said predetermined food weight is reached, and shut-off means for the supply source operatively connected to said one side of the balance arm adapted to stop the flow of food into the receptacle when the arm swings to the second unbalance position, the location of the centre of gravity of said balancing means causing the movement of the arm to accelerate as said arm moves towards the second unbalance position, thereby accelerating the operation of said shut-off means quickly to stop said flow of food.

2. Apparatus for portioning animal food in predetermined amounts, comprising pivot means, a balance arm mounted on said pivot means, adjustable balance means on one side of the pivot means and connected to the arm for normally retaining said arm in a first unbalance position, the centre of gravity of said balance means being located above said pivot means and remaining at a constant distance therefrom during balancing movement of the arm, a receptacle suspended from the arm on the other side of the pivot means and positioned to receive food from a supply source, said receptacle moving the arm to a second unbalance position opposite the first unbalance position the instant said receptacle receives a predetermined weight of food, said balance means retaining the arm in the first unbalance position until said predetermined food weight is reached, and shut-off means for the supply source operatively connected to said one side of the balance arm adapted to stop the flow of food into the receptacle when the arm swings to the second unbalance position, the location of the centre of gravity of said balancing means causing the movement of the arm to accelerate as said arm moves towards the second unbalance position, thereby accelerating the operation of said shut-off means quickly to stop said flow of food.

3. Apparatus for portioning animal food in predetermined amounts for a feeding trough and to be used with a food conveyor located above the trough and having outlet means therein for discharging food towards the trough, comprising support means carrying pivot means, a balance arm mounted on the pivot means of said support means, adjustable balance means on one side of the pivot means and connected to the arm for normally retaining said arm in a first unbalance position, the centre of gravity of said balance means being located above said pivot means and remaining at a constant distance therefrom during balancing movement of the arm, suspension means pivotally connected to the arm on the other side of the pivot means and depending from said arm, an open receptacle carried by said suspension means to be held by the latter beneath a conveyor to receive food therefrom, said receptacle moving the arm to a second unbalance position opposite the first unbalance position the instant said receptacle receives a predetermined weight of food, said balance means retaining the arm in the first unbalance position until said predetermined food weight is reached, and closure means operatively connected to said one side of the balance arm and adapted to be positioned to close and open the outlet means of the conveyor, said closure means closing the outlet means when the arm is moved to the second unbalance position by the predetermined amount of food entering the receptacle and opening the outlet means when the arm is in the first unbalance position, the location of the centre of gravity of said balancing means causing the movement of the arm to accelerate as said arm moves towards the second unbalance position, thereby accelerating the operation of said closure means quickly to close said outlet means.

4. Portioning apparatus as claimed in claim 3 in which the receptacle is pivotally connected to the suspension means, and including lever means connected to the receptacle and by means of which said receptacle may be tipped to empty the food out of it into said trough.

5. Apparatus for portioning animal food in predetermined amounts for a feeding trough and to be used with a food conveyor located above the trough and having outlet means therein for discharging food towards the trough, comprising support means carrying pivot means, a balance arm mounted on the pivot means of said support means, adjustable balance means on one side of the pivot means and connected to the arm for normally retaining said arm in a first unbalance position, the centre of gravity of said balance means being located above said pivot means and remaining at a constant distance therefrom during balancing movement of the arm, a pair of supporting bars pivotally connected to and depending from the arm on the other side of the pivot means, said bars having spaced free ends, an open receptacle mounted on said free ends of the bars, said bars being shaped to suspend the receptacle beneath a conveyor to receive food therefrom, said receptacle moving the arm to a second unbalance position opposite the first unbalance position the instant said receptacle receives a predetermined weight of food, said balance means retaining the arm in the first unbalance position until said predetermined food weight is reached, and a closure plate operatively connected to said one side of the balance arm and adapted to be moved to close and open the outlet means of the conveyor, said closure plate closing the outlet means when the arm is moved to the second unbalance position by the predetermined amount of food entering the receptacle and opening the outlet means when the arm is in the first unbalance position, the location of the centre of gravity of said balancing means causing the movement of the arm to accelerate as said arm moves towards the second unbalance position, thereby accelerating the operation of said closure plate quickly to close said outlet means.

6. Apparatus for portioning animal food in predetermined amounts for a feeding trough and to be used with a food conveyor located above the trough and having outlet means therein for discharging food towards the trough, comprising support means carrying pivot means, a balance arm mounted on the pivot means of said support means, adjustable balance means on one side of the pivot means and connected to the arm for normally retaining said arm in a first unbalance position, the centre of gravity of said balance means being located above said pivot means and remaining at a constant distance therefrom during balancing movement of the arm, suspension means pivotally connected to the arm on the other side of the pivot means and depending from said arm, an open receptacle carried by said suspension means to be held by the latter beneath the conveyor to receive food therefrom, said receptacle moving the arm to a second unbalance position opposite the first unbalance position the instant said receptacle receives a predetermined weight of food, said balance means retaining the arm in the first unbalance position until said predetermined food weight is reached, a closure plate, and suspension means for the closure plate operatively connected to said one side of the balance arm and adapted to swing said plate between positions closing and opening the outlet means of the conveyor, said closure plate closing the outlet means when the arm is moved to the second unbalance position by the predetermined amount of food entering the receptacle and opening the outlet means when the arm is in the first unbalance position, the location of the centre of gravity of said balancing means causing the movement of the arm to accelerate as said arm moves towards the second unbalance position, thereby accelerating the operation of said closure plate quickly to close said outlet means.

7. Apparatus for portioning animal food in predetermined amounts for a feeding trough and to be used with a food conveyor located above the trough and having outlet means therein for discharging food towards the trough, comprising a support carrying pivot means, a balance arm mounted between the ends thereof on said pivot means, a balance weight slidably mounted on the arm on one side of the pivot means and adapted to retain said arm in a first unbalance position, suspension means pivotally connected to the arm on the other side of the pivot means and depending from said arm, an open receptacle carried by said suspension means below the arm to be held by the suspension means beneath a conveyor to receive food therefrom, said receptacle moving the balance arm to a second unbalance position the instant said receptacle receives a predetermined weight of food, said balance means retaining the arm in the first unbalance position until said predetermined food weight is reached, closure means below the arm and positioned to close and open the outlet means of the conveyor, and a connector connecting said closure means to the balance arm on said one side of the pivot means, said closure means being held by the balance arm in position leaving the outlet means open when the receptacle is empty and being moved at an accelerating speed into position to close said outlet means when the predetermined amount of food has entered the receptacle.

8. Portioning apparatus as claimed in claim 7 in which the closure means comprises a plate swingably mounted near the food conveyor, said plate being swingable between positions closing and opening the conveyor.

9. Portioning apparatus as claimed in claim 7 in which the closure means comprises arms hingedly mounted above the food conveyor and extending downwardly relative thereto, a plate connected to lower ends of said arms and extending towards and beneath the conveyor, said plate being swingable between positions closing and opening the conveyor, an extension inclined upwardly from one of said arms across the top of the conveyor, and a weight adjustably mounted on said extension, said connector being connected to said extension.

10. Portioning apparatus as claimed in claim 7 in which the suspension means comprises a pair of supporting bars swingably connected to and depending from the arm, said bars having spaced lower ends, and means on the lower ends of the bars connecting the latter to the receptacle swingably to support said receptacle, said bars being shaped to suspend the receptacle beneath the food conveyor.

11. Portioning apparatus as claimed in claim 7 including an extension connected to the balance arm on said other side of the pivot means, an auxiliary balance arm connected to said extension and extending outwardly therefrom over and parallel to the balance arm, and a balance weight slidably mounted on said auxiliary balance arm.

12. Portioning apparatus as claimed in claim 11 including means adjustably connecting the auxiliary balance arm to the extension, whereby said auxiliary arm can be adjusted towards and away from the balance arm.

13. Apparatus for portioning animal food in predetermined amounts for a feeding trough and to be used with a food conveyor located above the trough and having outlet means therein for discharging food towards the trough, comprising two spaced supports each carrying pivot means, a substantially horizontal balance arm, said arm including spaced parallel extensions having ends interconnected by a bar and opposite free ends, each extension of the balance arm being mounted between the ends thereof on the pivot means of one of the supports, said pivot means being aligned and said bar being inclined horizontally relative thereto, a balance weight slidably mounted on the arm bar and movable between said extensions and adapted to retain said balance arm in a first unbalance position, the centre of gravity of said weight being above the pivot means of the supports, suspension means pivotally connected to and depending from the extensions between the free ends thereof and their respective supports, an open receptacle carried by said suspension means to be held by the latter beneath a conveyor to receive food therefrom, said receptacle moving the balance arm to a second unbalance position the instant said receptacle receives a predetermined weight of food, said balance weight retaining the arm in the first unbalance position until said predetermined food weight is reached, closure means positioned to close and open the outlet means of the conveyor, and connector means connecting said closure means to said extensions adjacent the free ends thereof, said closure means being held by the balance arm in position leaving the outlet means open when the receptacle is empty and being moved at an accelerating rate into position to close said outlet means when the predetermined amount of food has entered the receptacle.

14. Portioning apparatus as claimed in claim 13 including a weight slidably mounted on one of said extensions between the support of said extension and the balance arm bar, the centre of gravity of said weight being above the pivot means of the supports.

15. Apparatus for portioning animal food in predetermined amounts for a feeding trough and to be used with a food conveyor located above the trough and having outlet means therein for discharging food towards the trough, comprising two spaced supports each carrying pivot means, a substantially horizontal balance arm, said arm including spaced parallel extensions having ends interconnected by a bar and opposite free ends, each extension of the balance arm being mounted between the ends thereof on the pivot means of one of the supports, said pivot means being aligned and said bar being inclined horizontally relative thereto, a balance weight slidably mounted on the arm bar and movable between said extensions and adapted to retain said balance arm in a first unbalance position, the centre of gravity of said weight being above the pivot means of the supports, suspension means pivotally connected to and depending from the extensions between the free ends thereof and their respective supports, an open receptacle carried by said suspension means to be held by the latter beneath the conveyor to receive food therefrom, said receptacle moving the balance arm to a second unbalance position the instant said receptacle receives a predetermined weight of food, said balance weight retaining the arm in the first unbalance position until said predetermined food weight is reached, a support arm secured to and depending from each extension adjacent the free end thereof, and a closure plate carried by said support arms and positioned to open and close the outlet means of the food conveyor when said free ends swing respectively upwardly and downwardly, said closure plate being held by the balance arm in position leaving the outlet means open when the receptacle is empty and being moved at an accelerating rate into position to close said outlet means when the predetermined amount of food has entered the receptacle.

16. Portioning apparatus as claimed in claim 15 including hinge means connecting the closure plate to the support arm.

17. Portioning apparatus as claimed in claim 13 in which the suspension means comprises two supporting bars one swingably connected to and depending from each balance arm extension, said bars having spaced lower ends, and means on the lower ends of the bars connecting the latter to the receptacle swingably to support said receptacle, said bars being shaped to suspend the receptacle beneath the food conveyor.

18. Apparatus for portioning animal food in predetermined amounts for a feeding trough and to be used with a food conveyor located above the trough and having outlet means therein for discharging food towards the trough, comprising two spaced supports each carrying pivot means, a substantially horizontal balance arm, said arm including spaced parallel extensions having ends interconnected by a bar and opposite free ends, each extension of the balance arm being mounted between the ends thereof on the pivot means of one of the supports, said pivot means being aligned and said bar being inclined horizontally relative thereto, a balance weight slidably mounted on the arm bar and movable between said extensions and adapted to retain said balance arm in a first unbalance position, the centre of gravity of said weight being above the pivot means of the supports, a holder carrying pivot means for each extension, the pivot means of the holders being connected to their respective extensions with said holders depending from the extensions, a support bar connected to and depending from each holder, said bars having spaced free ends, an open receptacle mounted on said free ends of the bars, said bars being shaped to suspend the receptacle beneath the conveyor to receive food therefrom, said receptacle moving the balance arm to a second unbalance position the instant said receptacle receives a predetermined weight of food, said balance weight retaining the arm in the first unbalance position until said predetermined food weight is reached, closure means positioned to close and open the outlet means of the conveyor, and connector means connecting said closure means to said extensions adjacent the free ends thereof, said closure means being held by the balance arm in position leaving the outlet means open when the receptacle is empty and being moved at an accelerating rate into position to close said outlet means when the predetermined amount of food has entered the receptacle.

19. Apparatus for portioning animal food in predetermined amounts for a feeding trough and to be used with a food conveyor located above the trough and having outlet means therein for discharging food towards the trough, comprising two spaced supports each carrying pivot means, a substantially horizontal balance arm, said arm including spaced parallel extensions, having ends interconnected by a bar and opposite free ends, each extension of the balance arm being mounted between the ends thereof on the pivot means of one of the supports, said pivot means being aligned and said bar being inclined horizontally relative thereto, a balance weight slidably mounted on the arm bar and movable between said extensions and adapted to retain said balance arm in a first unbalance position, the centre of gravity of said weight being above the pivot means of the supports, a holder carrying pivot means for each extension, the pivot means of the holders being connected to their respective extensions with said holders depending from the extensions, a support bar connected to and depending from each holder, said bars having spaced free ends, an open receptacle mounted on said free ends of the bars, said bars being shaped to suspend the receptacle beneath the conveyor to receive food therefrom, said receptacle moving the balance arm to a second unbalance position the instant said receptacle receives a predetermined weight of food, said balance weight retaining the arm in the first unbalance position until said predetermined food weight is reached, a support arm secured to and depending from each extension adjacent the free end thereof, and a closure plate carried by said support arms and positioned to open and close the outlet means of the food conveyor when said free ends swing respectively upwardly and downwardly, said closure plate being held by the balance arm is position leaving the outlet means open when the receptacle is empty and being moved at an accelerating rate into position to close said outlet means when the predetermined amount of food has entered the receptacle.

20. Portioning apparatus as claimed in claim 19 including hinge means connecting the closure plate to the support arm.

References Cited by the Examiner
UNITED STATES PATENTS

| | | | |
|---|---|---|---|
| 589,081 | 8/1897 | Griffith | 177—120 X |
| 674,386 | 5/1901 | Schuman | 177—120 |
| 691,536 | 1/1902 | Ericson | 177—120 |
| 706,588 | 8/1902 | Nickerson | 177—120 |
| 1,082,354 | 12/1913 | Mulloy | 177—120 X |
| 2,303,140 | 11/1942 | Sackett | 177—120 X |
| 3,185,230 | 5/1965 | Blough | 177—71 |

SAMUEL KOREN, *Primary Examiner.*

HUGH R. CHAMBLEE, *Examiner.*